US012659639B2

(12) United States Patent
Hsu

(10) Patent No.: US 12,659,639 B2
(45) Date of Patent: Jun. 16, 2026

(54) DAMPING STRUCTURE AND PROJECTION DEVICE

(71) Applicant: Coretronic Corporation, Hsin-Chu (TW)

(72) Inventor: En-Huai Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 556 days.

(21) Appl. No.: 18/177,099

(22) Filed: Mar. 1, 2023

(65) Prior Publication Data

US 2023/0280641 A1      Sep. 7, 2023

(30) Foreign Application Priority Data

Mar. 4, 2022    (CN) .......................... 202210209526.5

(51) Int. Cl.
*H04R 1/02*          (2006.01)
*G03B 21/14*        (2006.01)

(52) U.S. Cl.
CPC .......... *H04R 1/026* (2013.01); *G03B 21/145* (2013.01)

(58) Field of Classification Search
CPC ....... G03B 21/145; G03B 21/14; H04R 1/026
See application file for complete search history.

(56) References Cited

U.S. PATENT DOCUMENTS

| 6,336,615 | B1 * | 1/2002 | Jeon | ........................ | H04N 5/642 248/220.42 |
| 6,744,903 | B1 * | 6/2004 | Jeon | ........................ | H04N 5/642 381/388 |
| 6,760,460 | B1 * | 7/2004 | Jeon | ........................ | H04N 5/642 381/388 |
| 2008/0316698 | A1 * | 12/2008 | Yeh | ........................ | G11B 33/08 361/679.33 |

(Continued)

FOREIGN PATENT DOCUMENTS

| CN | 105529864 A | 4/2016 |
| CN | 105422706 | 3/2020 |

(Continued)

OTHER PUBLICATIONS

"Office Action of China counterpart Application", issued on Aug. 22, 2025, p. 1-p. 8.

*Primary Examiner* — Bao-Luan Q Le

(74) *Attorney, Agent, or Firm* — JCIPRNET

(57) ABSTRACT

The disclosure provides a damping structure and a projection structure having the damping structure, and the damping structure has improved damping effects and occupies a smaller disposition space. The projection device includes a casing and a speaker. The damping structure includes an extension body and an elastic buffer. The extension body extends from the speaker and has multiple columnar parts. The elastic buffer is disposed between the extension body and the casing, and the elastic buffer has a central part and multiple holes. The central part is limited to the casing. The (Continued)

holes surround the central part. The columnar parts respectively pass through the holes to connect the elastic buffer to the extension body. A gap is formed between a section of the elastic buffer and the extension body to provide a space for relative displacement of the section and the extension body.

10 Claims, 8 Drawing Sheets

(56) References Cited

U.S. PATENT DOCUMENTS

| | | | | |
|---|---|---|---|---|
| 2009/0057525 A1* | 3/2009 | Yeh | F16F 15/08 | |
| | | | | 248/638 |
| 2009/0242322 A1* | 10/2009 | Tsai | F16F 1/373 | |
| | | | | 181/207 |
| 2010/0027231 A1* | 2/2010 | Chang | F16F 1/3732 | |
| | | | | 267/141 |
| 2011/0001280 A1* | 1/2011 | Huang | F16F 1/3732 | |
| | | | | 267/140.4 |

| | | | | |
|---|---|---|---|---|
| 2011/0186705 A1* | 8/2011 | Ke | H04R 1/026 | |
| | | | | 248/220.21 |
| 2011/0227849 A1* | 9/2011 | Olien | G06F 3/016 | |
| | | | | 361/679.01 |
| 2014/0072158 A1* | 3/2014 | Yamada | G03B 21/14 | |
| | | | | 353/15 |
| 2014/0138121 A1* | 5/2014 | Blazic | H01B 5/16 | |
| | | | | 174/135 |
| 2016/0379685 A1* | 12/2016 | Lyu | G11B 33/08 | |
| | | | | 248/346.03 |
| 2018/0191989 A1* | 7/2018 | Wang | H04R 1/025 | |
| 2019/0182582 A1* | 6/2019 | Huang | H04R 1/028 | |
| 2020/0329302 A1* | 10/2020 | Hsu | H04R 1/288 | |
| 2021/0152904 A1* | 5/2021 | Jiang | H04R 1/025 | |
| 2021/0176559 A1* | 6/2021 | Shen | H04R 1/026 | |

FOREIGN PATENT DOCUMENTS

| | | |
|---|---|---|
| CN | 211778693 | 10/2020 |
| CN | 112135112 A | 12/2020 |
| JP | 2004213724 A | 7/2004 |
| JP | 2009281513 A | 12/2009 |
| TW | 201322868 A | 6/2013 |

* cited by examiner

DAMPING STRUCTURE AND PROJECTION DEVICE

CROSS-REFERENCE TO RELATED APPLICATION

This application claims the priority benefit of China application serial no. 202210209526.5 filed on Mar. 4, 2022. The entirety of the above-mentioned patent application is hereby incorporated by reference herein and made a part of this specification.

BACKGROUND

Technical Field

The disclosure relates to a damping structure and a projection device, and more particularly, to a damping structure adapted for a speaker and a projection device including the damping structure.

Description of Related Art

In order to provide a better audio and video experience, an ultra-short-throw projector needs to integrate a high-power speaker therein. A high-power speaker generates large vibrations when playing heavy bass, which causes the ultra-short-throw lens to vibrate and causes blurred projection images. In order to overcome this problem, a rubber bushing is generally installed between the speaker and the casing for damping. In order for the rubber bushing to effectively absorb vibrations in different axial directions, it is necessary to design the rubber bushing to have sufficient thickness in each axial direction. However, this excessively increases the volume of the rubber bushing and makes it difficult to be disposed in the narrow interior space of the ultra-short-throw projector.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a damping structure having improved damping effects and occupying a smaller disposition space.

The disclosure provides a projection structure which has a damping structure having improved damping effects and occupying a smaller disposition space.

Other objectives and advantages of the disclosure may be further understood from the technical features disclosed in the disclosure.

In order to achieve one or part or all of the above objectives or other objectives, an embodiment of the disclosure provides a damping structure adapted for a projection device, the projection device including a casing and a speaker. The damping structure includes an extension body and an elastic buffer. The extension body extends from the speaker and has multiple columnar parts. The elastic buffer is disposed between the extension body and the casing, and the elastic buffer has a central part and multiple holes. The central part is limited to the casing. The holes surround the central part. The columnar parts respectively pass through the holes to connect the elastic buffer to the extension body. A gap is formed between a section of the elastic buffer and the extension body to provide a space for relative displacement of the section and the extension body.

In order to achieve one or part or all of the above objectives or other objectives, an embodiment of the disclosure provides a projection device, including a casing, a speaker and a damping structure. The damping structure includes an extension body and an elastic buffer. The extension body extends from the speaker and has multiple columnar parts. The elastic buffer is disposed between the extension body and the casing, and the elastic buffer has a central part and multiple holes. The central part is limited to the casing. The holes surround the central part. The columnar parts respectively pass through the holes to connect the elastic buffer to the extension body. A gap is formed between a section of the elastic buffer and the extension body to provide a space for relative displacement of the section and the extension body.

In an embodiment of the disclosure, the extension body has an opening; the central part passes through the opening; and the gap is formed between the central part and an inner wall of the opening.

In an embodiment of the disclosure, the elastic buffer has two stoppers; the two stoppers are respectively connected to two opposite ends of the central part; two opposite surfaces of the extension body are respectively stopped by the two stoppers; the holes are formed in at least one of the stoppers; and the columnar parts are formed on at least one of the surfaces.

In an embodiment of the disclosure, a part of the holes is formed in one of the stoppers; another part of the holes is formed in the other of the stoppers; a part of the columnar parts is formed on one of the surfaces; and another part of the columnar parts is formed on the other of the surfaces.

In an embodiment of the disclosure, a number of the holes on the stoppers is at least three, and a number of the columnar parts on the surfaces is at least three.

In an embodiment of the disclosure, the damping structure further includes a position-limiting component; the central part has a through hole and is sleeved on a column of the casing through the through hole; and the position-limiting component is connected to the column and limits the central part to the column.

Based on the above, the embodiments of the disclosure have at least one of the following advantages or effects. The elastic buffer is hooked on the multiple columnar parts of the extension body through the multiple holes, and there is a gap between a section of the elastic buffer and the extension body, so that the vibration of each axial direction may be absorbed by the elastic buffer at the holes and released at the gap. Moreover, the buffering effect of the elastic buffer may be adjusted simply by changing the thickness of the elastic buffer at the holes. Therefore, a good damping effect may be provided without increasing the overall thickness of the elastic buffer in each axial direction. Therefore, the damping effect of the damping structure is improved and a smaller disposition space is occupied.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B"

component. Accordingly, the drawings and descriptions will be regarded as illustrative in nature and not as restrictive.

Figure 1:
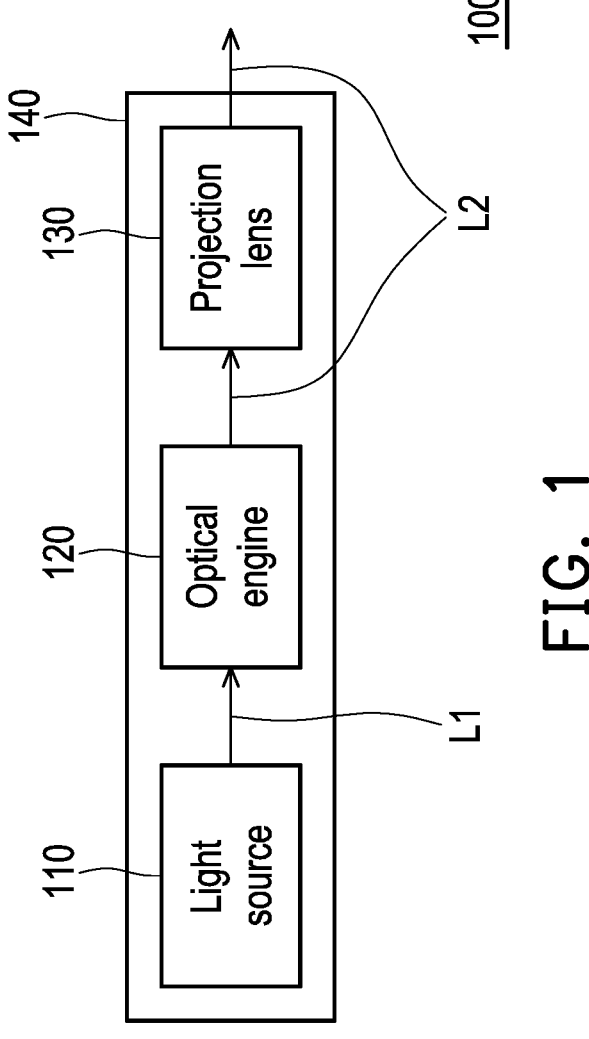
FIG. 1 is a schematic view of a projection device according to an embodiment of the disclosure.

FIG. 1 is a schematic view of a projection device according to an embodiment of the disclosure. Please refer to FIG. 1. A projection device 100 of this embodiment includes a light source 110, an optical engine 120, a projection lens 130 and a casing 140. The light source 110 is disposed in the casing 140 and is adapted for providing an illumination light beam L1. The optical engine 120 is disposed in the casing 140 and located on the transmission path of the illumination light beam L1, and is adapted for converting the illumination light beam L1 into an image light beam L2. The projection lens 130 is disposed on the casing 140 and located on the transmission path of the image light beam L2, and is adapted for projecting the image light beam L2.

The optical engine 120 includes, for example, a light valve element and other optical transmission elements. The light valve element is, for example, a digital micro-mirror device (DMD), a liquid-crystal-on-silicon panel (LCOS panel) or a transmissive liquid crystal panel (transmissive LCD). The optical transmission elements may include lenses, mirrors, beam splitters or other elements for transmitting light beams, and the like.

Figure 2:
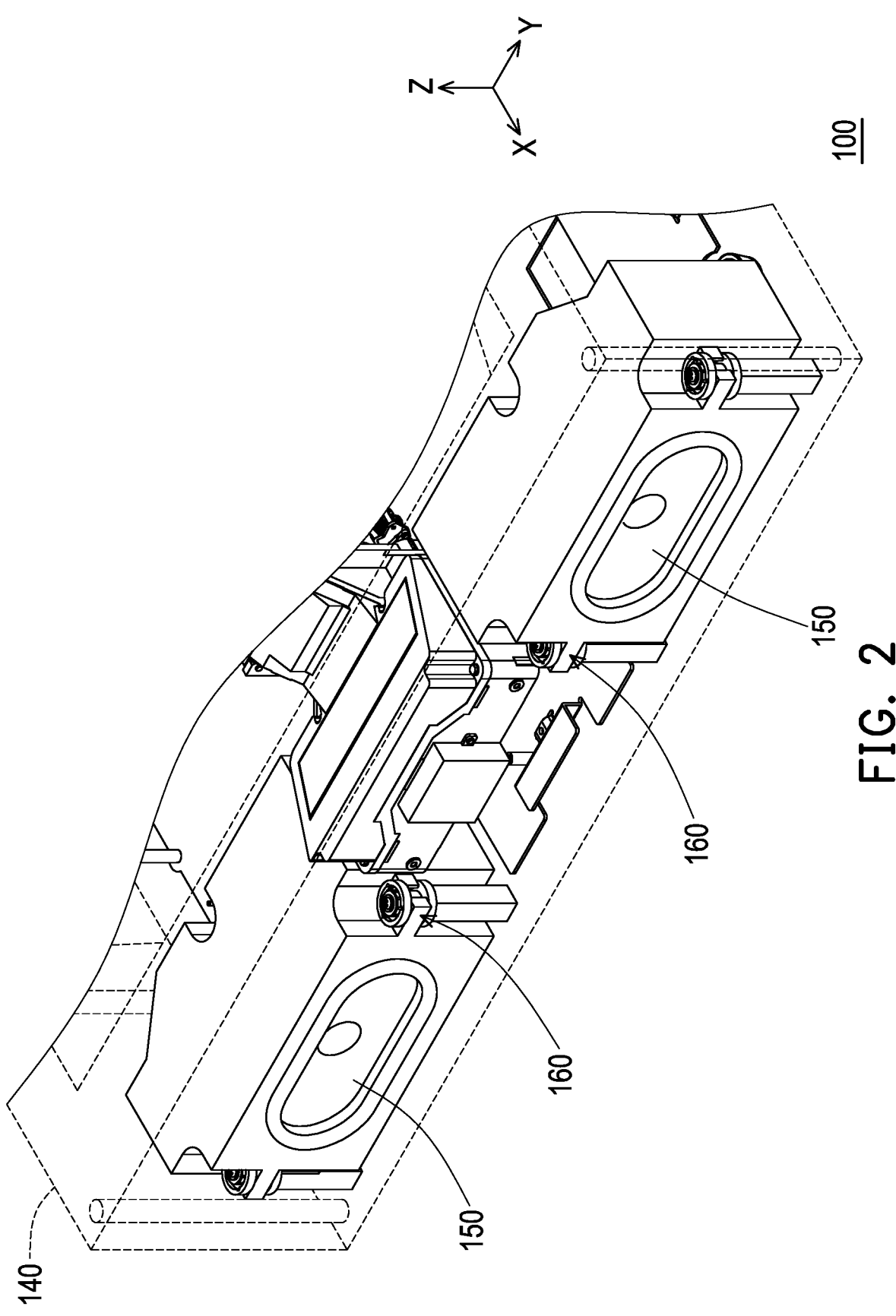
FIG. 2 is a partial perspective view of the projection device of FIG. 1.

FIG. 2 is a partial perspective view of the projection device of FIG. 1. Please refer to FIG. 2. The projection device 100 of this embodiment is, for example, an ultra-short-throw projector, and further includes at least one speaker 150 (shown as multiple) and at least one damping structure 160 (shown as multiple). The speaker 150 is disposed in the casing 140 and is adapted for transmitting the audio of the projection device 100 to the outside. The damping structure 160 is disposed on the casing 140 and located between the casing 140 and the speaker 150, and is adapted for buffering the vibrations generated by the speaker 150, and the buffering method is described in detail below.

Figure 3:
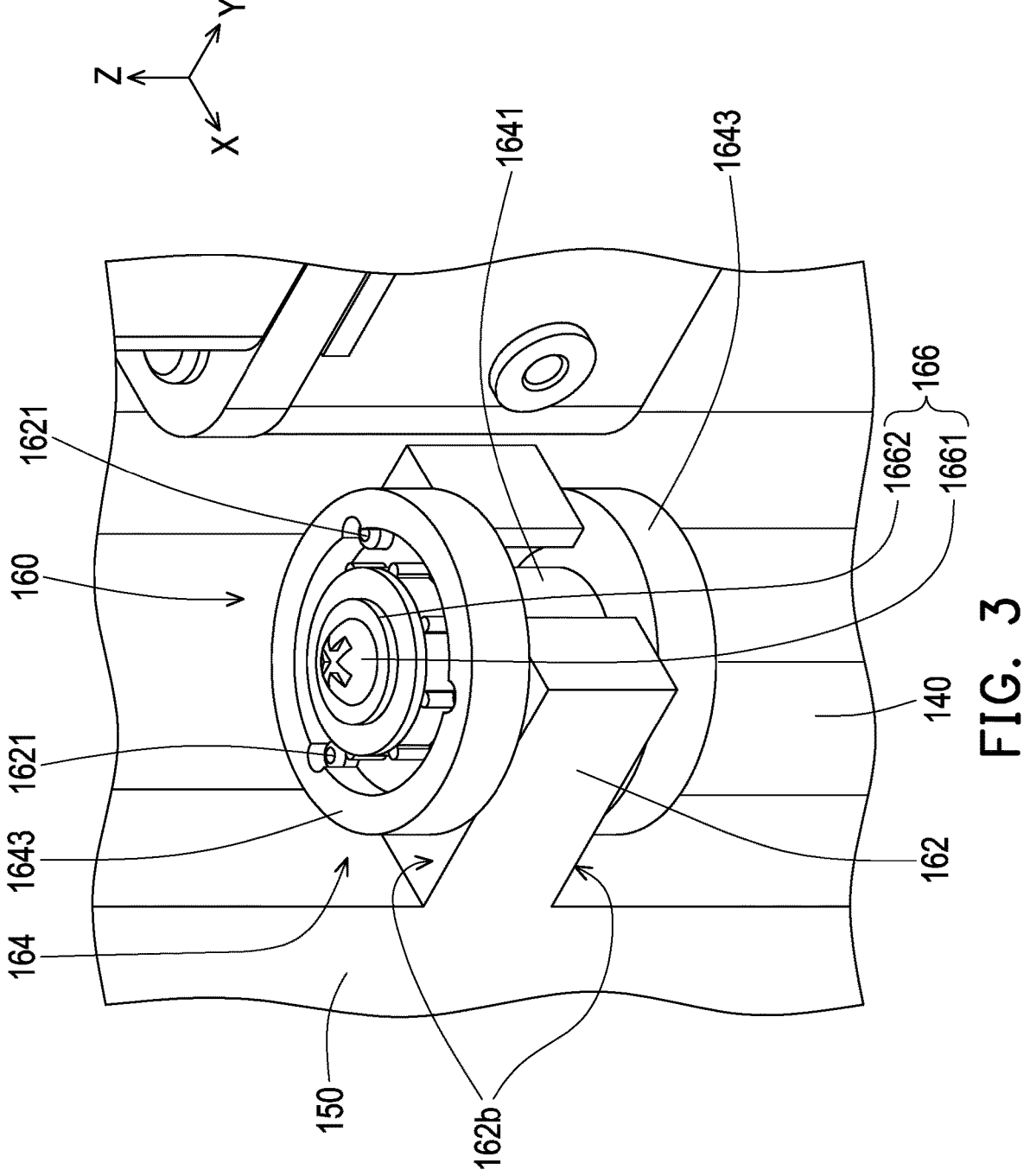
FIG. 3 is a partial enlarged view of the projection device of FIG. 2 at the damping structure.
Figure 4:
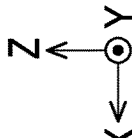
FIG. 4 is a partial cross-sectional view of the projection device of FIG. 2 at the damping structure.
Figure 5:
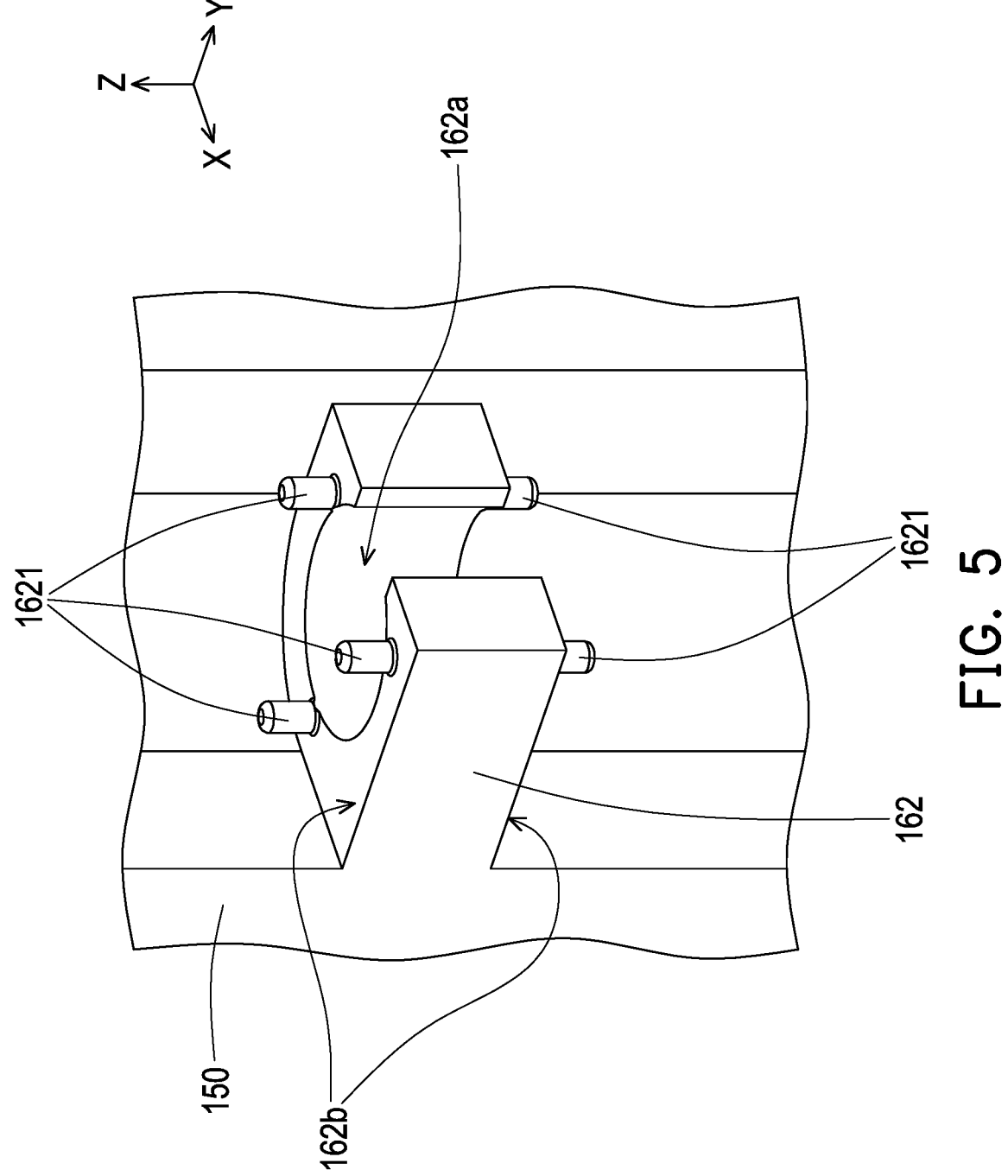
FIG. 5 is a perspective view of an extension part and a local part of the speaker of FIG. 3.
Figure 6:
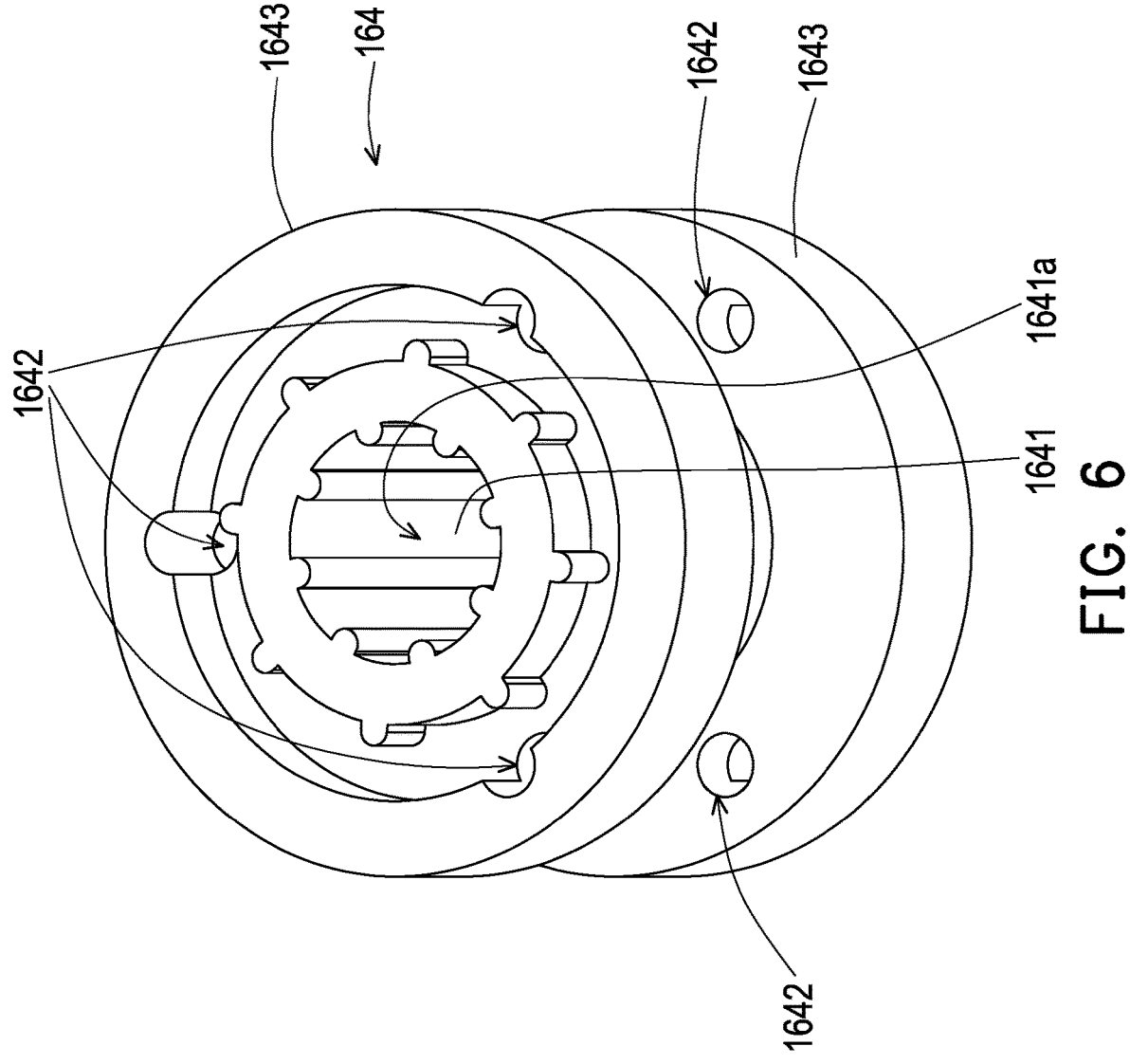
FIG. 6 is a perspective view of an elastic buffer of FIG. 3.

FIG. 3 is a partial enlarged view of the projection device of FIG. 2 at the damping structure. FIG. 4 is a partial cross-sectional view of the projection device of FIG. 2 at the damping structure. FIG. 5 is a perspective view of an extension part and a local part of the speaker of FIG. 3. FIG. 6 is a perspective view of an elastic buffer of FIG. 3. Please refer to FIGS. 3 to 6. The damping structure 160 of this embodiment includes an extension body 162 and an elastic buffer 164. The extension body 162 extends from the speaker 150 and has multiple columnar parts 1621. The elastic buffer 164 is, for example, a rubber member, which is disposed between the extension body 162 and the casing 140 and has a central part 1641 and multiple holes 1642 surrounding the central part 1641. The central part 1641 of the elastic buffer 164 is limited to the casing 140, and the multiple columnar parts 1621 of the extension body 162 respectively pass through the multiple holes 1642 of the elastic buffer 164 to hook the elastic buffer 164 to the extension body 162. A gap G is formed between a section S of the elastic buffer 164 and the extension body 162 to provide a space for relative displacement of the section S and the extension body 162.

With this configuration, the vibrations generated by the speaker 150 in each axial direction (for example, axial directions X, Y and Z) may be absorbed by the elastic buffer 164 at the holes 1642, and released at the gap between the elastic buffer 164 and the extension body 162. Moreover, the buffering effect of the elastic buffer 164 may be adjusted simply by changing the thickness of the elastic buffer 164 at the holes 1641. Therefore, a good damping effect may be provided without increasing the overall thickness of the elastic buffer 164 in each axial direction. Therefore, the damping effect of the damping structure 160 is improved and a smaller disposition space is occupied.

In detail, in this embodiment, the extension body 162 has an opening 162*a* (marked in FIG. 4 and FIG. 5); the central part 1641 of the elastic buffer 164 passes through the opening 162*a*, and the gap G is formed between the central part 1641 and the inner wall of the opening 162*a*. In addition, the elastic buffer 164 has two stoppers 1643, and the two stoppers 1643 are respectively connected to opposite ends of the central part 1641. The two opposite surfaces 162*b* of the extension body 162 are respectively stopped by the two stoppers 1643, and the holes 1642 of the elastic buffer 164 are formed in the two stoppers 1643, and the columnar parts 1621 of the extension body 162 are formed on the two surfaces 162*b*.

More specifically, a part of the holes 1642 of the elastic buffer 164 is formed in one stopper 1643, and another part of the holes 1642 of the elastic buffer 164 is formed in the other stopper 1643. Correspondingly, a part of the columnar parts 1621 of the extension body 162 is formed on one surface 162*b*, and another part of the columnar parts 1621 of the extension body 162 is formed on the other surface 162*b*. Accordingly, both the upper and lower ends of the elastic buffer 164 may be hooked to the columnar parts 1621 of the extension body 162 through the holes 1642. In addition, the number of the multiple holes 1642 on each stopper 1643 is at least three (shown as three), and the number of the multiple columnar parts 1621 on each surface 162*b* is at least three (shown as three), so that the elastic buffer 164 may be stably hooked to the extension body 162.

Figure 7:
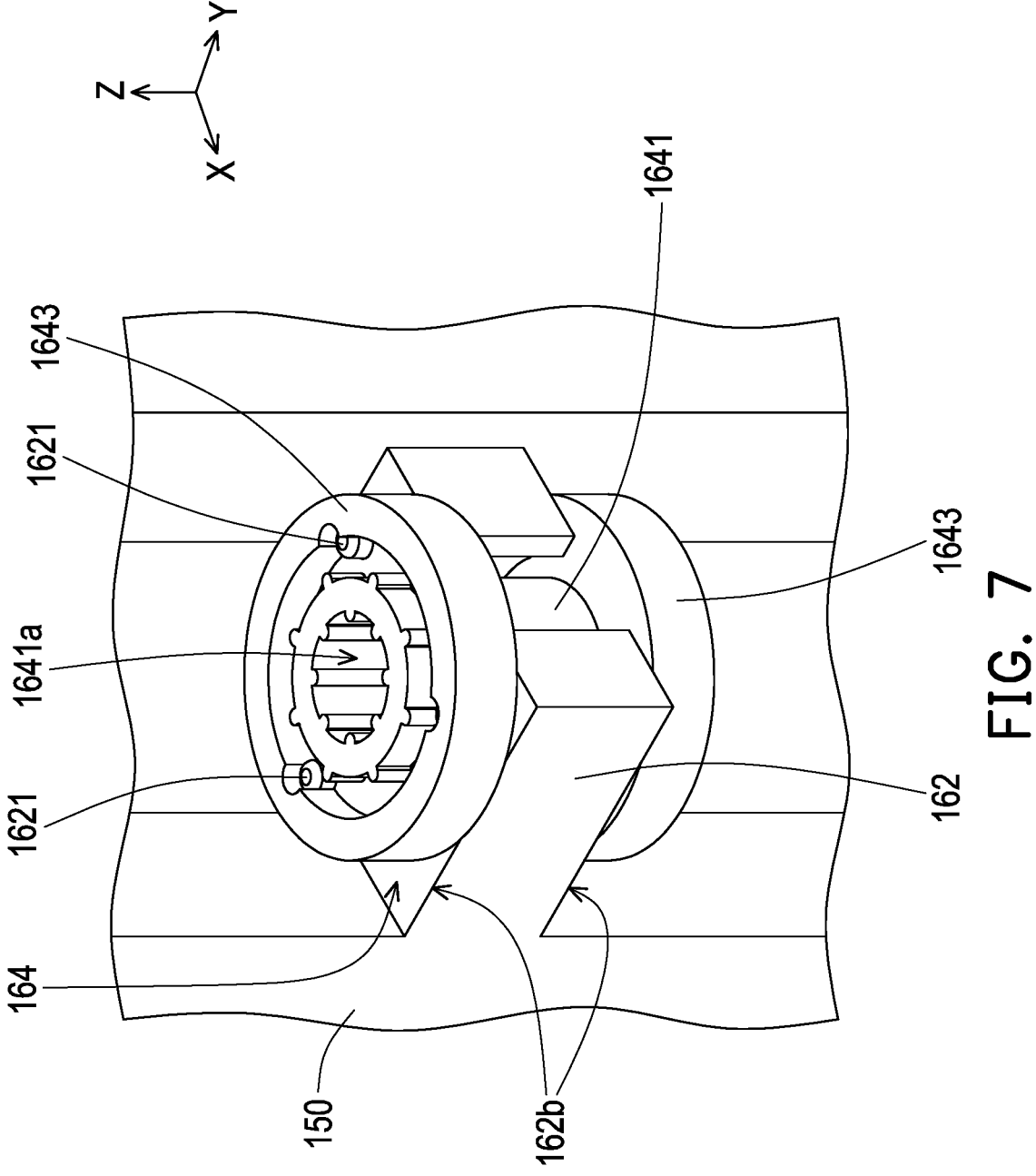
FIG. 7 shows some components of the damping structure of FIG. 3.
Figure 8:
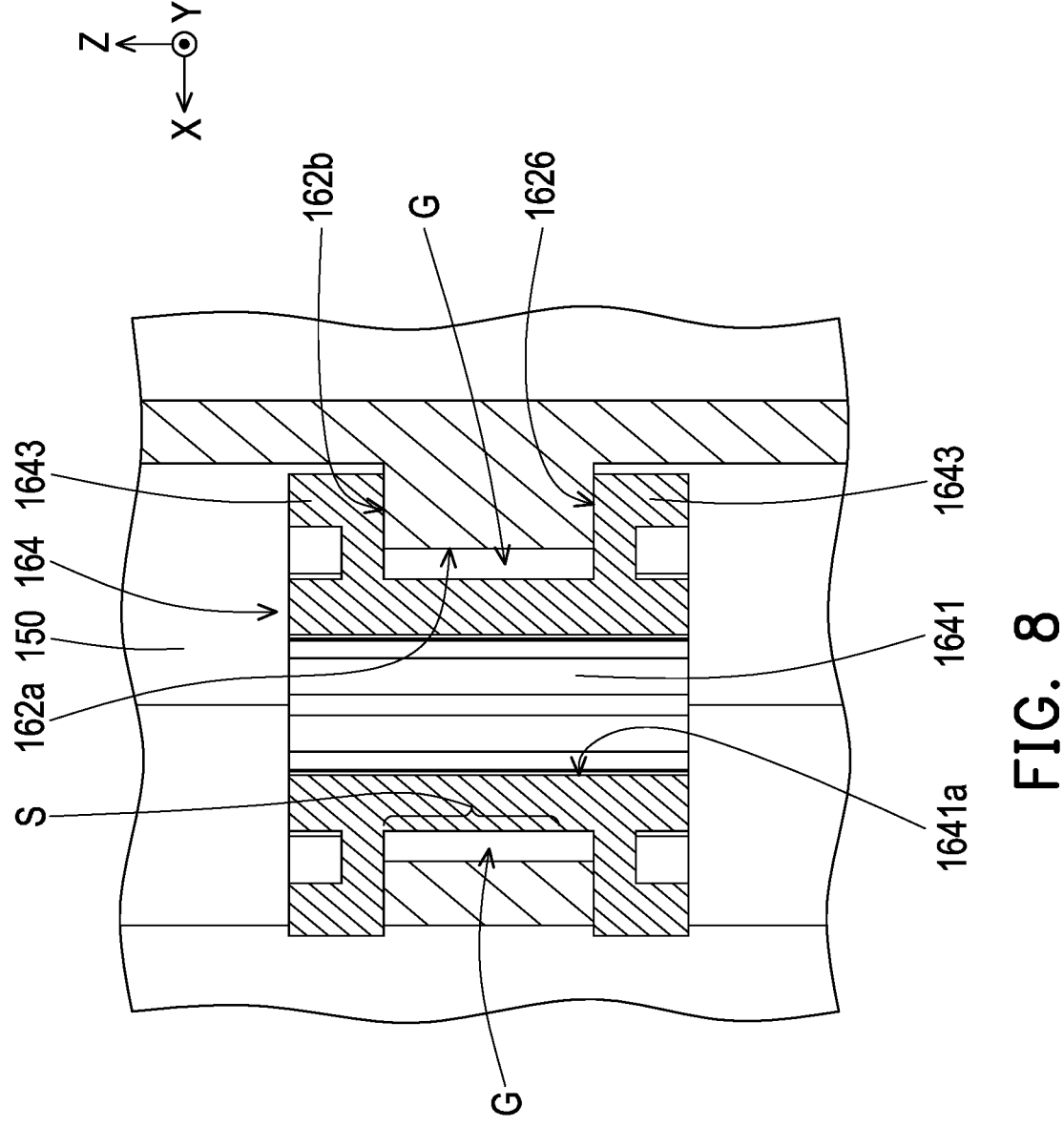
FIG. 8 shows some components of the damping structure of FIG. 4.

FIG. 7 shows some components of the damping structure of FIG. 3. FIG. 8 shows some components of the damping structure of FIG. 4. Please refer to FIGS. 3, 4, 7 and 8. In this embodiment, the damping structure 160 further includes a position-limiting component 166. The position-limiting component 166 is, for example, a screw and washer set including a screw 1661 and a washer 1662. The central part 1641 of the elastic buffer 164 has a through hole 1641*a* and is sleeved on a column 142 of the casing 140 through the through hole 1641*a*. The screw 1661 of the position-limiting component 166 is screwed and connected to the column 142 of the casing 140 to press down the washer 1662 toward the elastic buffer 164. The washer 1662 limits the central part 1641 of the elastic buffer 164 to the column 142 so as to firmly fix the elastic buffer 164.

To sum up, the embodiments of the disclosure have at least one of the following advantages or effects. The elastic buffer is hooked on the multiple columnar parts of the extension body through the multiple holes, and there is a gap between a section of the elastic buffer and the extension body, so that the vibration of each axial direction may be absorbed by the elastic buffer at the holes and released at the gap. Moreover, the buffering effect of the elastic buffer may be adjusted simply by changing the thickness of the elastic buffer at the holes. Therefore, a good damping effect may be provided without increasing the overall thickness of the elastic buffer in each axial direction. Therefore, the damping effect of the damping structure is improved and a smaller disposition space is occupied.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A damping structure adapted for a projection device, the projection device comprising a casing and a speaker, the damping structure comprising:

an extension body which extends from the speaker and has a plurality of columnar parts; and an elastic buffer which is disposed between the extension body and the casing, wherein the elastic buffer has a central part and a plurality of holes, the central part is limited to the casing, the holes surround the central part, the columnar parts respectively pass through the holes to connect the elastic buffer to the extension body, wherein a gap is formed between a section of the elastic buffer and the extension body to provide a space for relative displacement of the section and the extension body, and wherein the elastic buffer has two stoppers, the two stoppers are respectively connected to two opposite ends of the central part, the extension body has two surfaces opposite to each other, the two surfaces of the extension body are respectively abutted against the two stoppers, the holes are formed in at least one of the stoppers, and the columnar parts are formed on at least one of the surfaces.

2. The damping structure according to claim 1, wherein the extension body has an opening, the central part passes through the opening, and the gap is formed between the central part and an inner wall of the opening.

3. The damping structure according to claim 1, wherein a part of the holes is formed in one of the stoppers, another part of the holes is formed in the other of the stoppers, a part of the columnar parts is formed on one of the surfaces, and another part of the columnar parts is formed on the other of the surfaces.

4. The damping structure according to claim 1, wherein a number of the holes on the at least one of the stoppers is at least three, and a number of the columnar parts on the at least one of the surfaces is at least three.

5. The damping structure according to claim 1, further comprising a position-limiting component, wherein the central part has a through hole and is sleeved on a column of the casing through the through hole, and the position-limiting component is connected to the column and limits the central part to the column.

6. A projection device comprising:

a casing;

a speaker disposed in the casing; and a damping structure comprising:

an extension body which extends from the speaker and has a plurality of columnar parts; and an elastic buffer which is disposed between the extension body and the casing, wherein the elastic buffer has a central part and a plurality of holes, the central part is limited to the casing, the holes surround the central part, the columnar parts respectively pass through the holes to connect the elastic buffer to the extension body, wherein a gap is formed between a section of the central part and the extension body to provide a space for relative displacement of the section and the extension body, and wherein the elastic buffer has two stoppers, the two stoppers are respectively connected to two opposite ends of the central part, the extension body has two surfaces opposite to each other, the two surfaces of the extension body are respectively abutted against the two stoppers, the holes are formed in at least one of the stoppers, and the columnar parts are formed on at least one of the surfaces.

7. The projection device according to claim 6, wherein the extension body has an opening, the central part passes through the opening, and the gap is formed between the central part and an inner wall of the opening.

8. The projection device according to claim 6, wherein a part of the holes is formed in one of the stoppers, another part of the holes is formed in the other of the stoppers, a part of the columnar parts is formed on one of the surfaces, and another part of the columnar parts is formed on the other of the surfaces.

9. The projection device according to claim 6, wherein a number of the holes on the at least one of the stoppers is at least three, and a number of the columnar parts on the at least one of the surfaces is at least three.

10. The projection device according to claim 6, wherein the damping structure further comprises a position-limiting component, the central part has a through hole and is sleeved on a column of the casing through the through hole, and the position-limiting component is connected to the column and limits the central part to the column.

* * * * *